United States Patent
Crumley

(10) Patent No.: US 10,323,672 B2
(45) Date of Patent: Jun. 18, 2019

(54) METHOD OF DETERMINING THE MAGNITUDE OF TENSION IN A TENSION TIE MEMBER

(71) Applicant: Harvel Crumley, Jacksonville Beach, FL (US)

(72) Inventor: Harvel Crumley, Jacksonville Beach, FL (US)

(*) Notice: Subject to any disclaimer, the term of this patent is extended or adjusted under 35 U.S.C. 154(b) by 0 days.

(21) Appl. No.: 15/183,524

(22) Filed: Jun. 15, 2016

(65) Prior Publication Data

US 2016/0363152 A1     Dec. 15, 2016

Related U.S. Application Data

(63) Continuation of application No. 14/603,530, filed on Jan. 23, 2015, now Pat. No. 9,371,658.

(Continued)

(51) Int. Cl.

| | |
|---|---|
| *E04C 5/08* | (2006.01) |
| *E04C 5/12* | (2006.01) |
| *F16B 31/02* | (2006.01) |
| *E04G 23/02* | (2006.01) |
| *E04B 2/20* | (2006.01) |

(Continued)

(52) U.S. Cl.
CPC .............. *F16B 31/028* (2013.01); *E04B 1/40* (2013.01); *E04B 1/98* (2013.01); *E04B 2/16* (2013.01); *E04B 2/20* (2013.01); *E04C 1/00* (2013.01); *E04C 1/39* (2013.01); *E04C 5/08* (2013.01); *E04C 5/125* (2013.01); *E04G 21/12* (2013.01); *E04G 23/0218* (2013.01); *E04G 23/0229* (2013.01); *E04H 9/021* (2013.01);

(Continued)

(58) Field of Classification Search
CPC ..... E04B 1/40; E04B 1/98; E04B 2/16; E04B 2/20; E04B 2002/0254; E04B 2103/02; F16B 31/028; E04C 5/04; E04C 5/125; E04C 1/39; E04C 1/00; E04H 9/14; E04H 9/021; E04H 9/027; E04G 23/0218; E04G 23/0229; E04G 21/12
See application file for complete search history.

(56) References Cited

U.S. PATENT DOCUMENTS 1,963,535 A * 6/1934 Trotter .................... F16B 39/24
411/149
4,889,457 A * 12/1989 Hageman .............. F16B 31/028
411/10

(Continued)

OTHER PUBLICATIONS

United States Patent and Trademark Office, Office Action for U.S. Appl. No. 15/082,640, dated Jul. 17, 2017.

(Continued)

*Primary Examiner* — Jacob J Cigna
*Assistant Examiner* — Lee A Holly
(74) *Attorney, Agent, or Firm* — Stephen E. Kelly; Hill Ward Henderson, P.A.

(57) ABSTRACT

A load indicating washer, or tension washer, for visually indicating pre-determined magnitudes of tension force in a tension tie member. The tension washer comprises a body portion with a deformable, curved annular flange member depending from the body portion. When the tension washer is compressed against a flat bearing surface, the flange member deforms to produce a visual or color indication of the magnitude of load in the tie member.

5 Claims, 6 Drawing Sheets

Related U.S. Application Data

(60) Provisional application No. 61/930,819, filed on Jan. 23, 2014.

(51) Int. Cl.
  *E04C 1/00* (2006.01)
  *E04H 9/02* (2006.01)
  *E04G 21/12* (2006.01)
  *E04B 2/16* (2006.01)
  *E04B 1/98* (2006.01)
  *E04C 1/39* (2006.01)
  *E04H 9/14* (2006.01)
  *E04B 1/41* (2006.01)
  *E04B 2/02* (2006.01)

(52) U.S. Cl.
  CPC ............... *E04H 9/027* (2013.01); *E04H 9/14* (2013.01); *E04B 2002/0254* (2013.01); *E04B 2103/02* (2013.01)

(56) References Cited

U.S. PATENT DOCUMENTS

| | | | |
|---|---|---|---|
| 6,425,718 B1* | 7/2002 | Herr | F16B 31/028 411/10 |
| 7,373,846 B2* | 5/2008 | Furukawa | G01N 3/02 177/136 |
| 8,894,328 B2 | 11/2014 | Zeitler et al. | |

OTHER PUBLICATIONS

United States Patent and Trademark Office, Office Action for U.S. Appl. No. 15/082,640, dated Jan. 10, 2018.

* cited by examiner

METHOD OF DETERMINING THE MAGNITUDE OF TENSION IN A TENSION TIE MEMBER

CROSS-REFERENCE TO RELATED APPLICATION

Pursuant to 35 U.S.C. § 120, this application is a continuation of U.S. patent application Ser. No. 14/603,530, filed on Jan. 23, 2015, which claimed the benefit under 35 U.S.C. § 119(e) of U.S. Provisional Patent Application Ser. No. 61/930,819, filed on Jan. 23, 2014, the entire contents of each of which are incorporated herein by this reference.

BACKGROUND

1. Field of Invention

This invention relates generally to a washer for use with a tension tie member, where the washer provides a visual indication of the magnitude of the tension force in the tie member.

2. Description of Related Art

Tension tie members are commonly used in building construction to pre- or post-tension beams, columns, walls, or other structural elements. The tie members can be internal or external to the structural elements. The tie members are connected to the structural elements in a manner that applying a tension force in the tie member will deliver a corresponding compression force to the structural element. This compression force permits the structural element to resist an external load of a greater magnitude than the same element could have carried without the tie member installed.

Some types of construction techniques use materials that are difficult to consistently compress via tension tie members. For example, tension tie members used in wood frame construction are typically tensioned by a hand-held tool or machine, and such devices can be difficult to control or use. The resulting tension force in the tie members can vary greatly from one tie member to another.

It is an object of the load indicating washer described herein to provide a consistent and reliable visual indication of the magnitude of tension force in the tension tie member at the time of tie member installation.

SUMMARY

The load indicating washer, or tension washer, has a body portion defining a central bolt opening, and a deformable, curved annular flange member depending from the body and having an outer edge. The top surface of the tension washer is a different color than the edge and bottom surface of the washer. The edge and the bottom surface could be the same color or different colors. A threaded fastener, such as the mechanical tensioner, is passed through the opening of the tension washer and tensioned by a socket or wrench applying torque to a nut or bolt head. As the threaded fastener is tensioned, the deformable flange member is compressed against the flat bearing surface, thereby causing the flange member to curl upward toward the socket, lifting the edge away from the flat bearing surface. This flange member curling action continues until the color of the edge or the bottom surface becomes visible, thereby providing a visual indicator that the requisite tension level has been achieved in the fastener or mechanical tensioner.

DETAILED DESCRIPTION OF THE PREFERRED EMBODIMENTS

With reference to the drawings, the invention will now be described with regard for the best mode and the preferred embodiment. In general, the device disclosed herein is a load indicating washer, or tension washer, intended to provide a visual indication of a tension load in a mechanical fastener. The embodiments disclosed herein are meant for illustration and not limitation of the invention.

Figure 1:
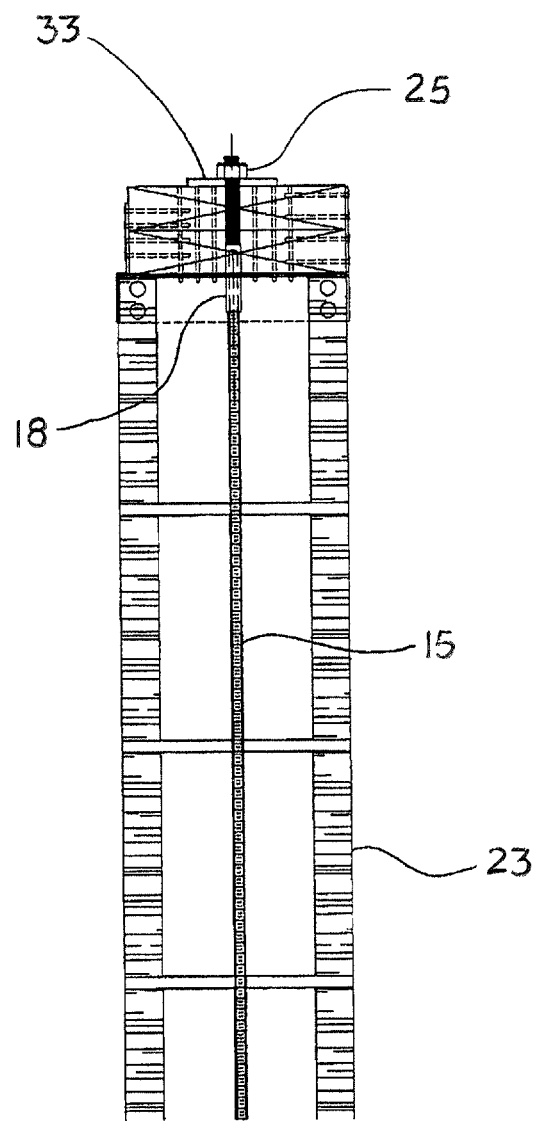
FIG. 1 is a cross section showing a typical anchorage of the tie member at the top of a structural wall.
Figure 2:
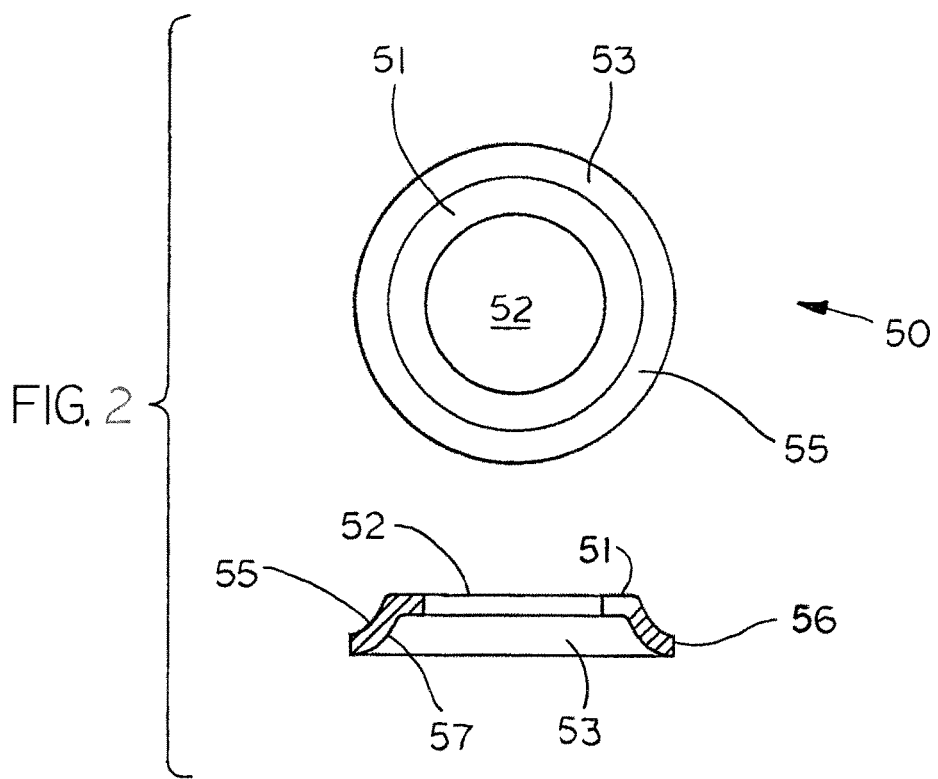
FIG. 2 shows a top view and a cross section of the tension washer.
Figure 3:
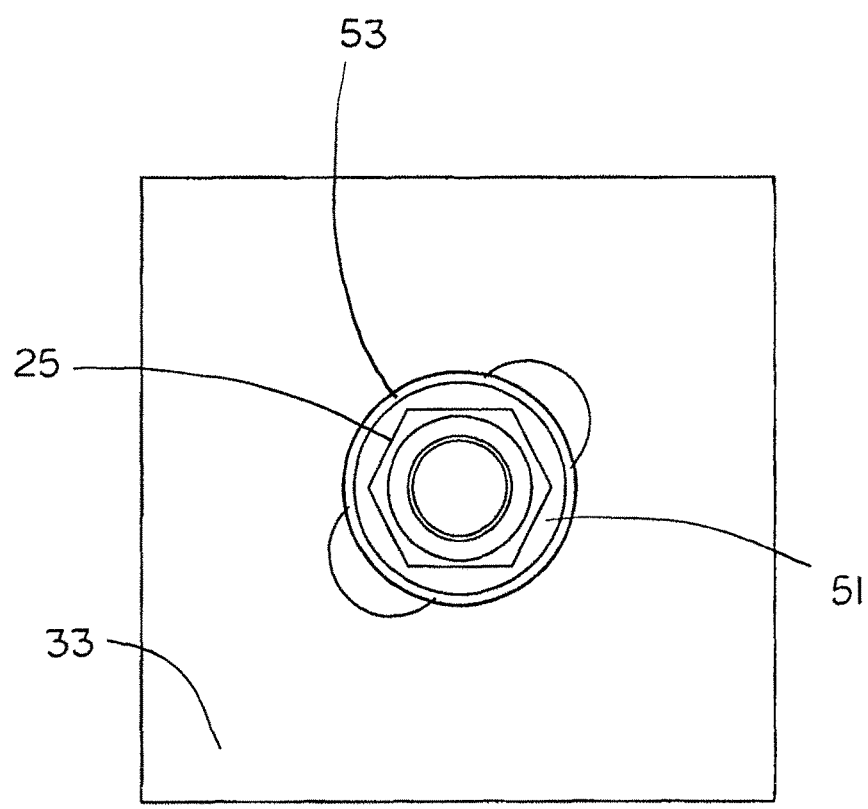
FIG. 3 is a plan view showing the tension washer connected to the flat bearing surface by a hexagonal bolt.
Figure 4:
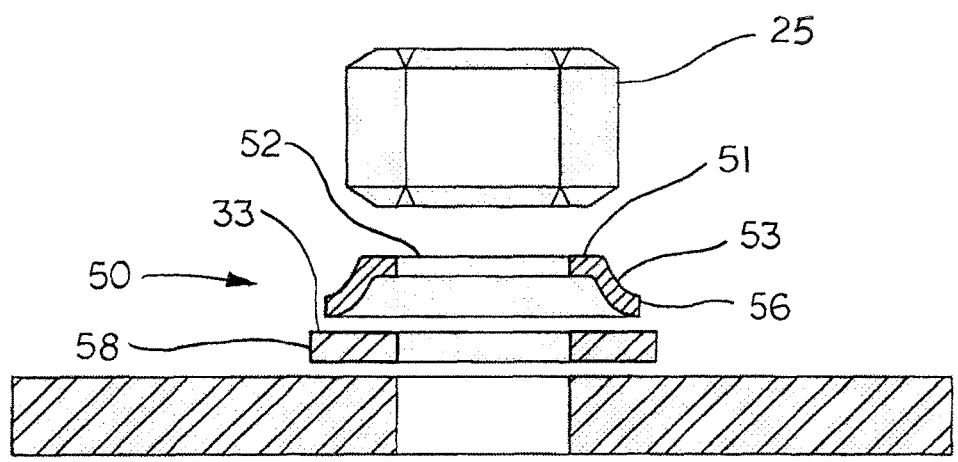
FIG. 4 is an exploded view of a cross section of the tension washer, spacing washer, and flat bearing surface, showing the proximate location of a typical hex bolt head.
Figure 5:
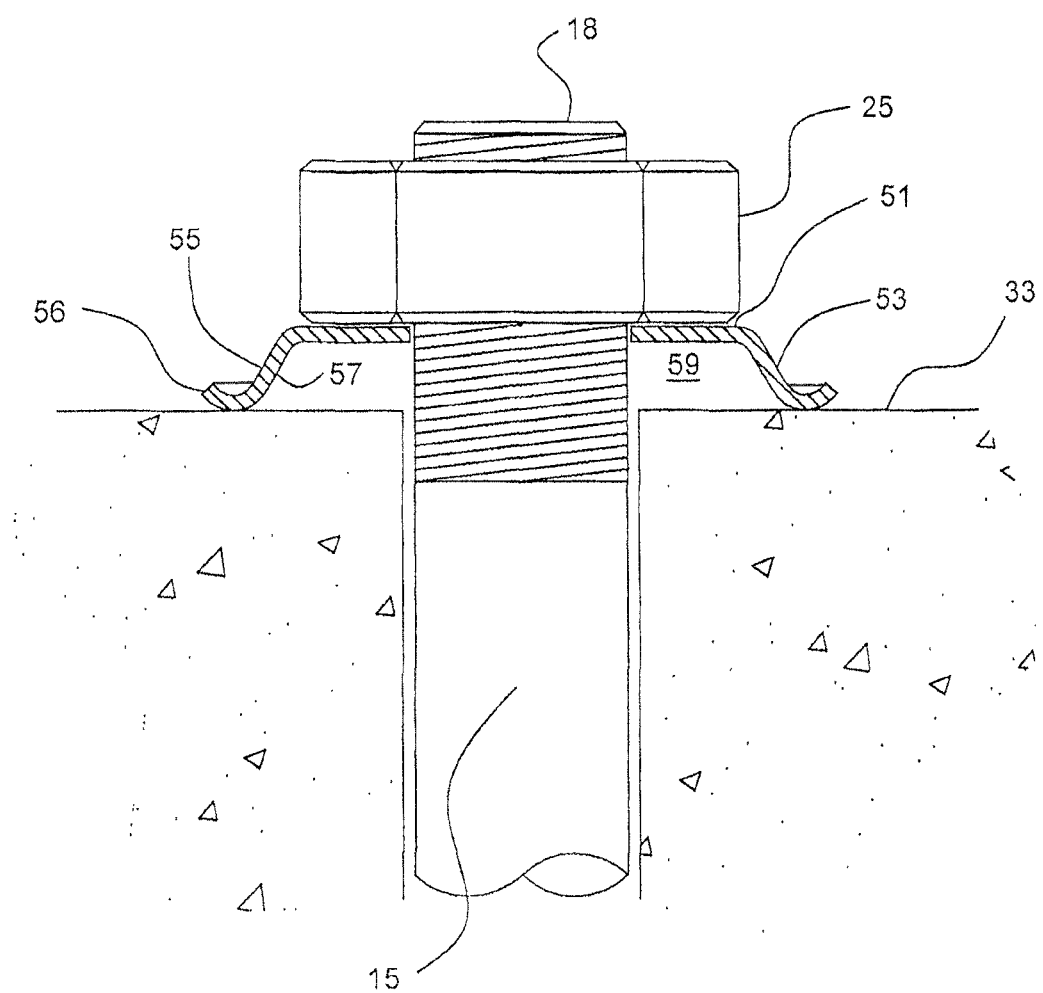
FIG. 5 shows a nut connected to a tension end of a tie member and compressing the tension washer against the flat bearing surface. The tension washer and flat bearing surface are shown in cross section.

The load indicating washer, or tension washer 50, is a device that provides a visual indication of a tension member reaching a certain magnitude of tension load. For example, referring to FIG. 1, the tension member could be a tie member 15 used to retain a wall 23 of a structure, such as a house or light commercial building. Such tie members 15 can be used in a manner where a nut 25 threads onto a tension end 18 of the tie member 15 and presses against a flat bearing surface 33, thereby causing a tension force in the tie member 15.

Referring to FIGS. 2-5, the tension washer 50 has a substantially planar body portion 51 defining a central bolt opening 52, and a deformable annular flange member 53 depending from the body 51. The tension washer 50 has a top surface 55, an edge 56, and a bottom surface 57. The deformable annular flange member 53 is curved from its base to the outer edge 56 such that the flange member 53 is concave upward toward the body 51. The bottom surface 27 of the flange member is placed against a flat bearing surface 33, such as the bearing plate member or a flat washer or spacer 58, such that the edge 56 is placed in contact with the flat bearing surface 33 in a substantially perpendicular orientation with respect to the flat bearing surface 33. Prior to loading the tension washer 50, the body 51 is separated from the flat bearing surface 33 by a space 59.

A tension end 18 is passed through the opening 52 of the tension washer 50 and tensioned by a socket or a wrench applying torque to a tension adjustment device 25, such as a nut or bolt head. As the tie member 15 is tensioned, such as by tightening the nut 25, the nut 25 exerts an increasing compression load on the tension washer 50. Under this compression load, the flange member 53 is compressed against the flat bearing surface 33, thereby causing the flange member 53 to expand outwardly by sliding along the flat bearing surface 33. During this action, the flange member 53 deforms by the edge 56 curling upward toward the nut 25 and away from the flat bearing surface 33 (See FIG. 5). Plastic deformation can occur in the outer fibers of the flange member 53 (the fibers along the bottom surface 27), thereby causing unrecoverable deformation and upward curling of the flange member 53. As the flange member 53 slides along the flat bearing surface 33 and curls upward, the body 51 moves toward the flat bearing surface 33, thereby closing the space 59. The flange member 53 thus has an unloaded shape and a first deformed shape.

Figure 6:
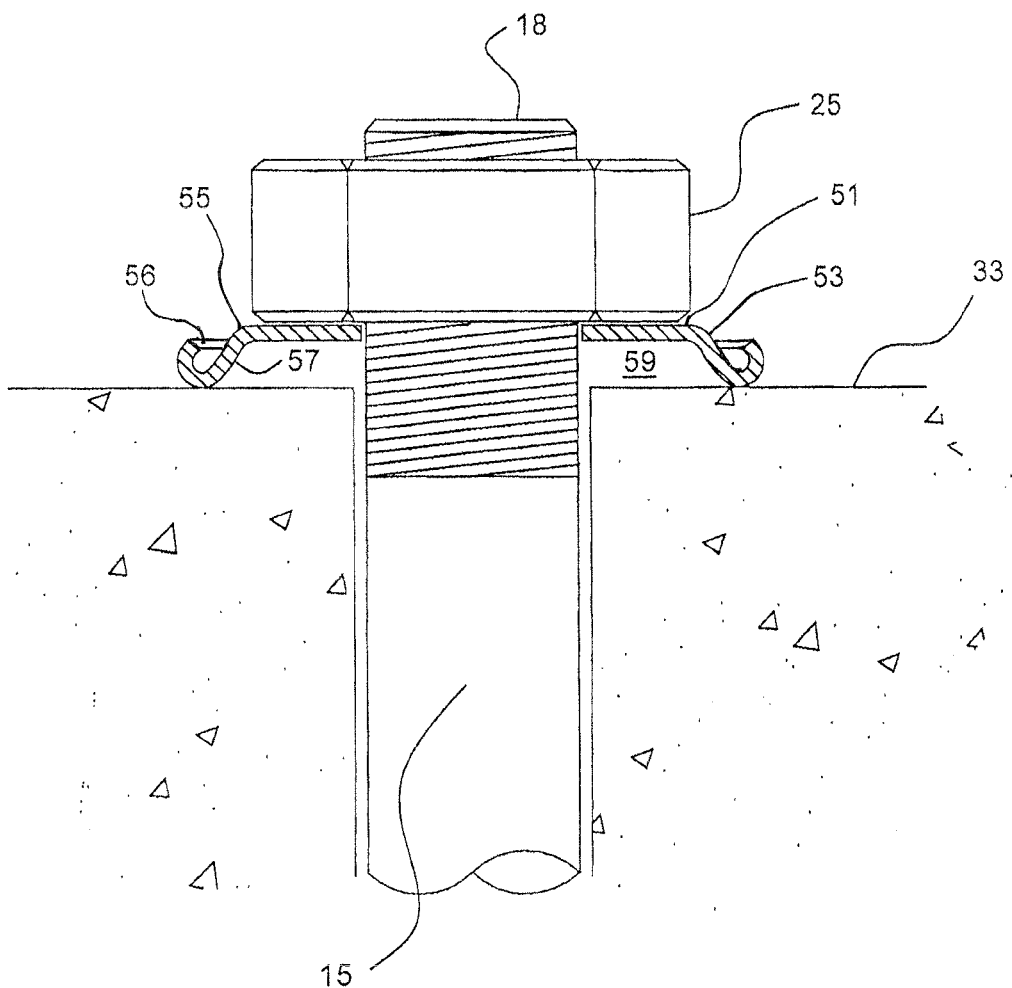
FIG. 6 shows a second deformed shape of a tension washer bearing against a flat bearing surface. The tension washer and flat bearing surface are shown in cross section.

The tension washer 50 is placed by fitting the central opening 52 over the tension end 18 of the tie member 15. Prior to loading, the annular flange 53 is in its unloaded shape, and the user sees only the top surface 55 without the edge 56 or bottom surface 57 being visible. As the tie member 15 is tensioned and the tension washer 50 is compressed against the flat bearing surface 33, flange member 53 takes on its first deformed shape under a first compression load. In the first deformed shape, the edge 56 becomes visible when the magnitude of the tension force in the tie member 15 reaches a first magnitude. As further tension is applied, the flange member 53 takes on a second deformed shape, shown in FIG. 6, under a second compression load when the magnitude of the tension force in the tie member 15 reaches a second magnitude, where the first magnitude is lower than the second magnitude. In the second deformed shape, the flange member 53 is severely curved, and the bottom surface 57 under the edge 56 becomes visible to the user. Thus, the edge 56 and the bottom surface 57 provide a two-stage visual indication of tension magnitude in the tie member 15 corresponding to the first deformed shape and the second deformed shape, respectively.

In one embodiment, the top surface 55 of the tension washer 50 is a different color than the edge 56 and bottom surface 57 of the washer 50. For example, the top surface 55 comprises a first color, and the edge 56 and bottom surface 57 comprise a second color. The tension washer 50 is placed on the tension end 18 and against the flat bearing surface 33. Prior to loading, the flange member 53 remains in its unloaded shape, and the user sees only the first color of the top surface 55 without the second color being visible. As the tension washer 50 is loaded, the edge 56 curling action begins, and it continues to the first deformed shape as described above, where the second color of the edge 56 or the bottom surface 57 becomes visible to the user. In this embodiment, the visibility of the second color provides a one-stage visual indicator that a pre-determined magnitude of tension level has been achieved in the tie member 15.

In another embodiment, the top surface 55, edge 56, and bottom surface 57 comprise a first color, a second color, and a third color, respectively. As the tension washer 50 is loaded, the edge 56 curling action continues as described above until the flange member 53 reaches its first deformed shape and the second color of the edge 56 becomes visible, thus indicating a first magnitude of tension force in the tie member 15. As the tie member 15 is tensioned further, the edge 56 curling action continues until the flange member 53 reaches its second deformed shape and the third color of the bottom surface 57 becomes visible to the user, thus providing a visual indication that a second magnitude of tension force has been reached in the tie member 15. The first magnitude is lower than the second magnitude. The visibility of the second color and the third color provides a two-stage visual indicator corresponding to two different magnitudes of tension achieved in the tie member 15—the first magnitude and the second magnitude.

The tension washer 50 is comprised of metal, plastic, or some other material that is capable of deforming properly under the required tension loads. In applications requiring a high tension force, the tension washer 50 comprises a material with a relatively high elastic modulus, such as steel, so that the tension washer 50 does not prematurely deform. In applications requiring lighter tension loads, the tension washer 50 comprises material of a lower elastic modulus, such as die cast metal or plastic, so that the tension washer 50 deforms properly under the lighter load. In another embodiment, proper sizing of the annular flange member 53 is a manner of ensuring that the tension member 50 deforms properly under the required tension load. The thickness of the annular flange member 53 is adjusted according to the required tension load. The annular flange member 53 is either thickened or thinned for larger or smaller tension loads, respectively. Also, the width of the annular flange member 53 can be made wider or more narrow as desired. The width of the flange member 53 affects its elasticity, with narrow flange members 53 being stiffer, and wider flange members 53 being less stiff.

In another embodiment, the edge 56 curls away from the flat bearing surface 33 until the edge 56 contacts the socket or wrench, thereby providing a physical indication to the user that the threaded fastener or mechanical tensioner 20 is properly tensioned.

The tension washer 50 can be used in a method of determining the magnitude of tension in the tension tie member 15 as follows. The tension washer 50 of any of the foregoing embodiments is installed by placing the central opening 52 over the tension end 18 of a tension tie member 15 such that the bottom surface 57 is placed in contact with the flat bearing surface 33. The tension adjustment device 25 is threaded onto the tension end 18 of the tie member 15. The tension adjustment device is adjusted to compress the tension washer 50 against the flat bearing surface 33 such that the annular flange member 53 begins to deform by curling upward toward the body portion 51, thereby causing separation between the edge 56 of the flange member 53 and the flat bearing surface 33. The step of adjusting the tension adjustment device can be stopped when the edge becomes visible to the user, the bottom surface becomes visible to the user, the first color becomes visible to the user, or the second color becomes visible to the user. A first magnitude of tension force in the tie member 15 is identified and reached when the edge 56 becomes visible to the user, or when the first color becomes visible to the user, as described above. Similarly, a second magnitude of tension force in the tie member 15 is identified and reached when the bottom surface 57 or the second color becomes visible to the user.

The foregoing embodiments are merely representative of the load indicating washer device and not meant for limitation of the invention. For example, persons skilled in the art would readily appreciate that there are several embodiments and configurations of the annular flange member that will not substantially alter the nature of the system. Likewise, elements and features of the disclosed embodiments could be substituted or interchanged with elements and features of other embodiments, as will be appreciated by an ordinary practitioner. Consequently, it is understood that equivalents and substitutions for certain elements and components set forth above are part of the device described herein, and the true scope of the invention is set forth in the claims below.

I claim:

1. A method of determining the magnitude of tension in a tension tie member, said method comprising the steps of:
    providing a tension washer for installation over a tension end of a tension tie member, wherein the tension washer includes:
        a body portion defining a central opening for receiving the tension end;
        a deformable annular flange member downwardly depending from the body portion and having a curved cross section defining a curved portion with a uniform thickness and oriented concave upwardly toward the body portion, the curved portion terminating at an outer edge, and the curved portion of the annular flange member being adapted to plastically deform when compressed against a flat bearing surface;

a top surface and a bottom surface, the bottom surface being adapted for placement against the flat bearing surface; and installing the tension washer onto a tension end of the tie member by placing the edge in contact with the flat bearing surface;

installing a tension adjustment device onto the tension end of the tie member; and adjusting the tension adjustment device to compress the tension washer against the flat bearing surface under a first compression load, thereby plastically deforming the annular flange member into a first plastically deformed shape under the first compression load, the first plastically deformed shape comprising curling of the curved portion such that the edge is separated from contact with the flat bearing surface.

2. The method of claim 1, further comprising the step of stopping the adjusting of the tension adjustment device when the curved portion of the annular flange member plastically deforms into the first plastically deformed shape.

3. The method of claim 1, wherein the top surface comprises a first color and the bottom surface comprises a second color, the first color being different than the second color, the bottom surface of the first plastically deformed shape is configured such that the second color in the first plastically deformed shape provides a visual indication of the first compression load, the method further comprising the step of:

stopping the adjusting of the tension adjustment device when the second color provides the visual indication of the first compression load.

4. A method of determining the magnitude of tension in a tension tie member, said method comprising the steps of:

providing a tension washer for installation over a tension end of a tension tie member, wherein the tension washer includes:

a body portion defining a circular central opening for receiving the tension end;

a deformable flange member connected to the body portion, the flange member defined by a curved cross section that forms a curved portion disposed axisymmetrically about the circular central opening, the flange member downwardly depending from the body portion and the curved portion oriented concave upwardly toward the body portion and terminating at an outer edge, the curved portion of the flange member being adapted to plastically deform when compressed against a flat bearing surface;

a top surface and a bottom surface, the bottom surface being adapted for placement against the flat bearing surface; and installing the tension washer onto a tension end of the tie member by placing the edge in contact with the flat bearing surface;

installing a tension adjustment device onto the tension end of the tie member;

adjusting the tension adjustment device to compress the tension washer against the flat bearing surface under a first compression load, thereby plastically deforming the curved portion of the annular flange into a first plastically deformed shape under the first compression load, the first plastically deformed shape comprising curling of the curved portion such that the edge is separated from contact with the flat bearing surface; and continuing adjustment of the tension adjustment device to compress the tension washer against the flat bearing surface under a second compression load, thereby further plastically deforming the curved annular flange into a second plastically deformed shape under the second compression load, the second compression load having a magnitude greater than that of the first compression load.

5. A method of determining the magnitude of tension in a tension tie member, said method comprising the steps of:

providing a tension washer over a tension end of a tension tie member, wherein the tension washer includes:

a body portion defining a central opening for receiving the tension end;

a deformable annular flange member downwardly depending from the body portion and having a curved cross section defining a curved portion with a uniform thickness, the curved portion oriented concave upwardly toward the body portion and terminating at an outer edge, and the curved portion of the annular flange member being adapted to plastically deform when compressed against a flat bearing surface;

a top surface comprising a first color and a bottom surface comprising a second color, the first color being different than the second color, the bottom surface being adapted for placement against the flat bearing surface;

installing the tension washer onto a tension end of the tie member by placing the edge in contact with the flat bearing surface;

installing a tension adjustment device onto the tension end of the tie member; and adjusting the tension adjustment device to compress the tension washer against the flat bearing surface under the first compression load, thereby plastically deforming the curved portion of the annular flange member into a first plastically deformed shape under the first compression load, the first plastically deformed shape comprising curling of the curved portion such that the edge is separated from contact with the flat bearing surface, thereby causing the second color to become visible, the second color providing a visual indication of the first compression load.

\* \* \* \* \*